Sept. 12, 1967                B. L. POSTON                3,341,071
           ARTICLE RELEASING MECHANISM FOR VENDING MACHINE
Filed Oct. 7, 1964                                   7 Sheets-Sheet 1

INVENTOR.
BYRON L. POSTON
BY Schmieding and Fulty

ATTORNEYS

FIG. 3

Sept. 12, 1967  B. L. POSTON  3,341,071
ARTICLE RELEASING MECHANISM FOR VENDING MACHINE
Filed Oct. 7, 1964  7 Sheets-Sheet 3

FIG. 4

INVENTOR.
BYRON L. POSTON
BY Schmieding and Fultz
ATTORNEYS

INVENTOR.
BYRON L. POSTON
BY Schmieding and Fulty
ATTORNEYS

INVENTOR.
BYRON L. POSTON

INVENTOR.
BYRON L. POSTON

United States Patent Office 3,341,071
Patented Sept. 12, 1967

3,341,071
ARTICLE RELEASING MECHANISM FOR
VENDING MACHINE
Byron L. Poston, Florissant, Mo., assignor to Ideal Dispenser Co., Columbus, Ohio, a corporation of Ohio
Filed Oct. 7, 1964, Ser. No. 402,142
12 Claims. (Cl. 221—125)

This application relates to vending machines and more particularly to a novel article release mechanism for such apparatus.

In general, the machine of the present invention comprises a frame means that supports a plurality of article supporting shelves each of which includes a respective article releasing gate.

The selective operability of any one of the article releasing gates, responsive to inserting coin in the machine, is controlled by a novel common bar and gate releasing lever mechanism wherein the common bar is shiftable between three positions, that is a stand-by position, a ready-to-vend position, and a lock-out position.

In the standby position, the common bar provides a positive sturdy obstruction to movement of all of the article releasing gates. Upon insertion of coin in the machine the common bar is electrically shifted by a solenoid to the ready-to-vend position wherein the common bar and lever mechanism is arranged to operate, in a novel manner, in combination with a plurality of lock-out members disposed along one side of the common bar in end to end relationship so as to be axially shiftable far enough to permit clearance for only one of the previously mentioned gate releasing levers to move into a respective recess provided in the common bar. With the above mentioned novel arrangement of the common bar, gate releasing levers, and lock-out members the lock-out members function as a primary lock-out mechanism to prevent actuation of all but the one selected gate after the common bar is moved to the ready-to-vend position.

The selected gate is next manually actuated to release the article which causes the gates respective associated gate releasing lever to drive the common bar from the ready-to-vend position to the lock-out position wherein the common bar itself serves as a positive secondary lock-out with respect to all of the gates but the one being actuated.

In addition to the above described common bar and lever mechanism the machine is provided with a unique actuating plate mechanism for the common bar which serves to shift the common bar from the standby position to the ready-to-vend position responsive to insertion of coin in the machine. Thereafter manual opening of the selected article releasing gate serves to drive the common bar through its lock-out position to complete the vending cycle.

The above mentioned common bar actuating plate mechanism further serves as a common bar arresting means, that comes into action at an appropriate time in the vending cycle, to prevent more than one cyclical actuation of the common bar whereby double vending is prevented.

As a primary advantage of the above described common bar and gate releasing lever mechanism the common bar is normally disposed in a standby position, rather than a ready-to-vend position, wherein a sturdy side of the common bar is disposed in positive obstructing relationship to the gate releasing levers whereby excessive manual force applied to the gates by anyone attempting to rob the machine is resisted by the sturdy common bar per se rather than by a relative sensitive latch or lever mechanism. That is to say, it is necessary to move the common bar from the initial standby position to the intermediate ready-to-vend position before manual effort exerted in opening a selected gate can impart force to the common bar latching mechanism, and this is only after a coin has been inserted in the machine to shift the common bar from the standby position wherein it forms a sturdy obstruction to gate movement to the ready-to-vend position.

As another aspect of the present invention the above described common bar and lever assembly, together with the article releasing gates can be mounted together as an assembly on an accessible and removable panel which is separate from the article storage shelf compartment and other portions of the machine. This provides a compact article releasing mechanism which is conveniently mountable on the front panel of the machine.

As another aspect of the present invention, the above mentioned article releasing gates are mounted to the frame by slideably attaching only the side of each gate to a solid gate mounting rod. This provides a more rugged and jamb proof gate mount as compared to prior metal flange gate mounting structures heretofore used with slideable article releasing gates.

It is therefore an object of the present invention to provide an improved vending machine that incorporates a novel common bar type article releasing apparatus wherein the common bar is normally disposed in a standby position and therein provides a rugged positive obstruction that prevents manual forcing of any of the article releasing gates, it being necessary to first insert coin into the machine to electrically shift the common bar to an intermediate ready-to-vend position wherein any one of the gates can be manually opened in order to complete the vending cycle.

It is another object of the present invention to provide in a machine of the type described, an article releasing mechanism that can be mounted as an assembly on a panel which is readily accessible and removable as an assembly from the other components of the vending machine.

It is still another object of the present invention to provide for a machine of the type described a novel mounting arrangement for a plurality of slideable article releasing gates.

Other objects and advantages of the present invention will be apparent from the following description, reference being had to the acompanying drawings wherein a preferred form or embodiment of the invention is clearly shown.

Figure 1:
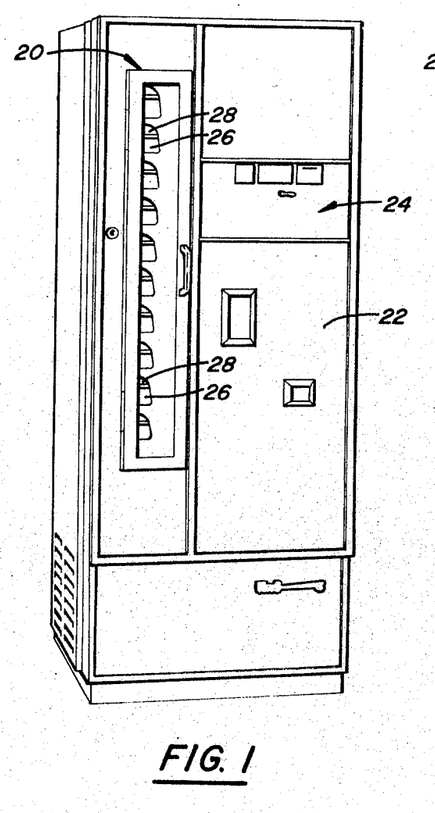
FIG. 1 is a front perspective view of a vending machine constructed in accordance with the present invention.

Referring in detail to the drawings, FIG. 1 illustrates a vending machine that includes a main frame 20 provided with a front access door 22 for loading the machine and a coin mechanism indicated generally at 24.

Figure 2:
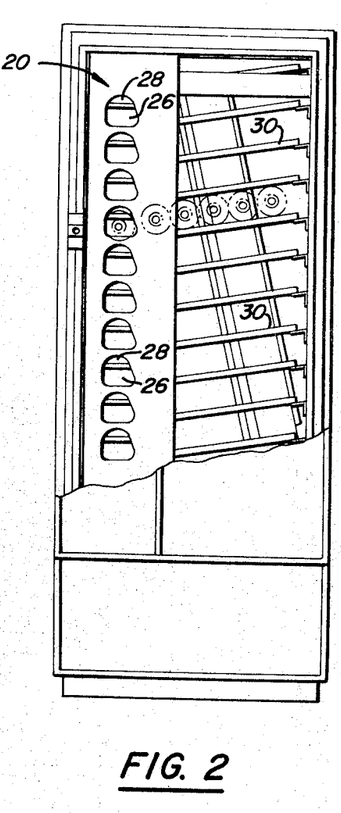
FIG. 2 is a front elevational view of the vending machine of FIG. 1 showing the machine with the front cover removed.

As seen in FIGS. 1 and 2, the frame of the machine supports an article releasing panel indicated generally at 40 that includes a plurality of article releasing openings 26 each of which is provided with a slideable mounted article releasing gate 28.

Figure 3:
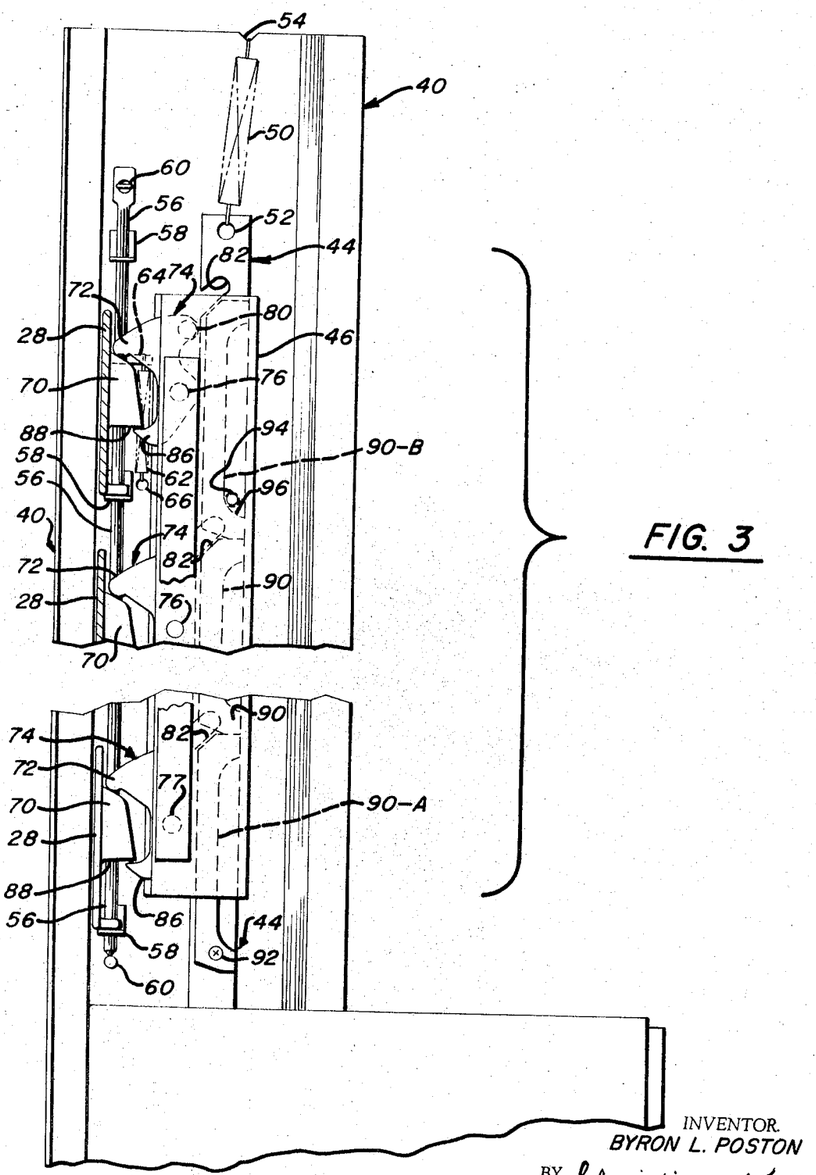
FIG. 3 is a broken front elevational view, partially in section, showing an article releasing gate and common bar mechanism and its associated relationship with a common bar actuating plate mechanism constructed in accordance with the present invention.
Figure 4:
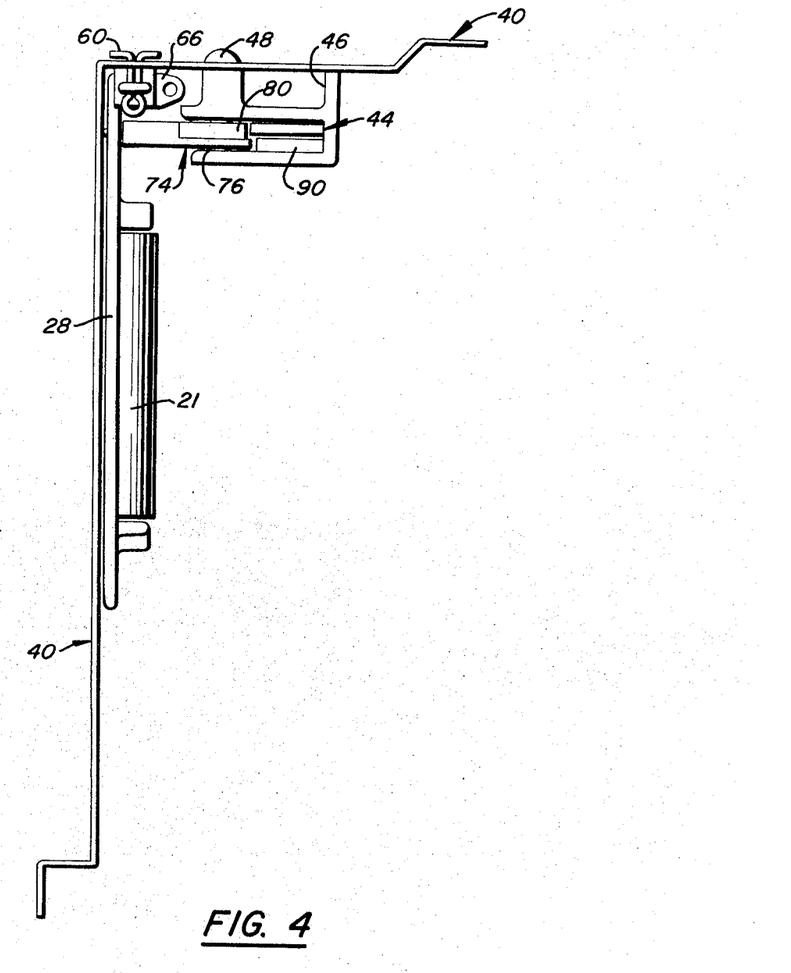
FIG. 4 is a top elevational view of the article releasing gate and common bar mechanism of FIG. 3.

Referring next to FIGS. 3 and 4, the article releasing mechanism comprises a common bar indicated generally at 44 that is slideably mounted to frame panel 40 by a vertically extending guide channel 46 secured to the panel by a plurality of screws 48.

As seen in FIG. 3, common bar 44 is normally urged upwardly to its standby position by a tension spring 50 connected between the top of the common bar at a hole 52 and the top edge of frame panel 40 at a notch 54. As is best seen in FIGS. 3 and 4, each of the gates is slidably mounted to the frame panel by a gate mounting rod 56 attached to the frame panel by a plurality of brackets 58, said rod being retained in the brackets by stop screws 60 located at each end of the rod.

Each of the gates 28 includes a roller 21 on its lower edges and is normally urged downwardly toward its closed position, illustrated in FIG. 3, by a tension spring 62 connected between a flange 64 on the gate and a mounting hole 66 in frame panel 40.

Each of the gates further include a lever actuating cam 70 that engages one arm 72 of a lever or gate releasing member indicated generally at 74, the latter pivotally mounted to the previously mentioned common bar guide 46 at a pivot pin 76.

As seen in FIG. 3, levers 74 are further provided with follower pins or gate releasing shoulders 80 arranged to enter respective open-ended slots 82 in common bar 44 and exert a camming action on the lower edges or cam surfaces of the slots after the common bar has been shifted to the ready-to-vend position as later to be described in detail herein.

It should further be mentioned that each of the levers 74 includes a lower arm 86 that underlies lower edge 88 of a respective gate cam member whereby return closing movement of the gate returns a respective lever 74 to its standby position illustrated in FIG. 3.

Referring again to FIG. 3, common bar guide 46 serves to mount a plurality of lock-out members 90 all but the lowermost one of which are longitudinally slideable along a side of common bar 44. The lowermost lock-out member 90–A has its lower end anchored to the lock-out bar by a screw 92.

It should further be mentioned that upward movement of the uppermost lock-out member 90–B is arrested by a pin 94 carried by the common bar which serves as a stop for a shoulder 96 on the lower end of the topmost lock-out member.

In view of the above, it will be understood that all of the lock-out members, above the gate being actuated, are free to shift upwardly to permit the entrance of a cam pin 80 of the lever at the particular gate being actuated. The amount of available upward movement for the lock-out members 90 is only sufficient to permit the entrance of one of the lever cam pins 80.

If the topmost gate is actuated, all of the lock-out members 90 are shifted downwardly with the common bar and restrained from separating at their end to end junctions whereby all of the gates below the topmost gate cannot be opened since their respective gate releasing levers are restrained from moving into the recesses 82 by the lock-out members 90.

Reference is next made to FIGS. 5 through 8 which illustrate the sequence of operation of the manually actuated article releasing gate 28 and associated common bar and lockout mechanism.

Figure 5:
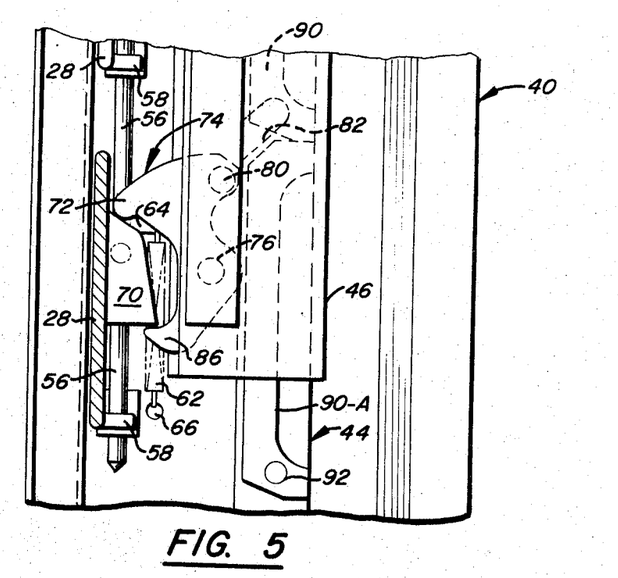
FIG. 5 is a front elevational view showing the common bar actuating plate mechanism in a standby position at the outset of the vending cycle.

In FIG. 5 lowermost gate 28 is shown by way of example in the standby position, ready for manual lifting, wherein the lowermost stationary lockout member 90–A has its upper ends in abutting relationship with the lock-out member 90 described above.

Figure 6:
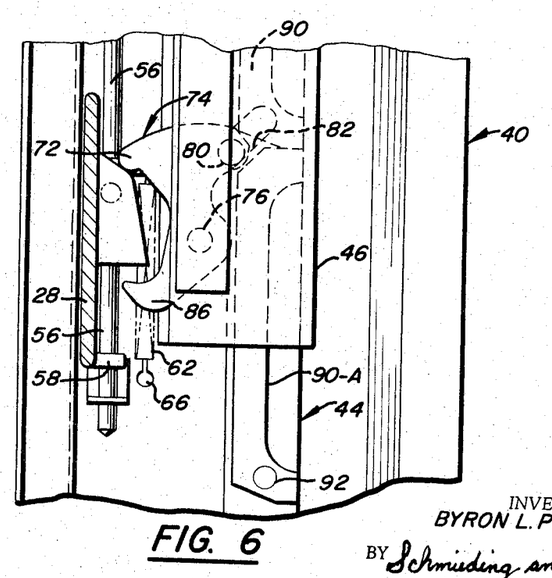
FIG. 6 is a front elevational view showing the plate mechanism of FIG. 5 after it has been shifted to a latched second position wherein the common bar has been moved to the ready-to-vend position.

FIG. 6 shows the gate 28 after it has been partially raised to a position wherein follower 80 confronts its respective open ended slot 82 to the location of follower pin 80.

Figure 7:
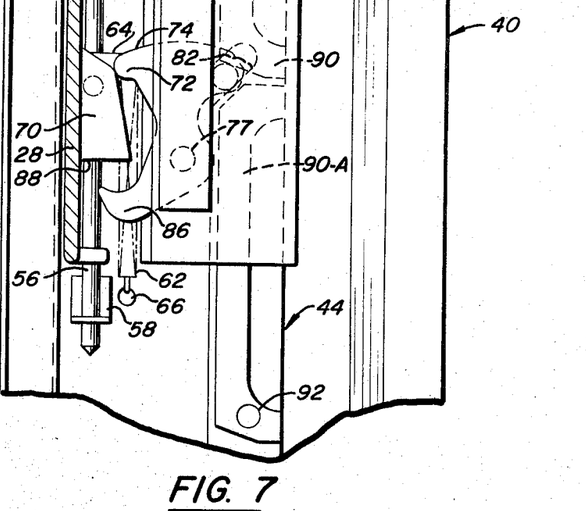
FIG. 7 is a third front elevational view of the actuating plate mechanism of FIGS. 5 and 6 wherein the common bar is being moved from the ready-to-vend position to its lock-out position thereby unlatching the actuating plate to permit return of the plate to the standby position.

FIG. 7 illustrates the configuration of the gate 28 and common bar 44 after the gate has been further moved upwardly so as to cam the common bar downwardly to the secondary lock-out and latch releasing position of FIG. 11 later to be described.

Figure 8:
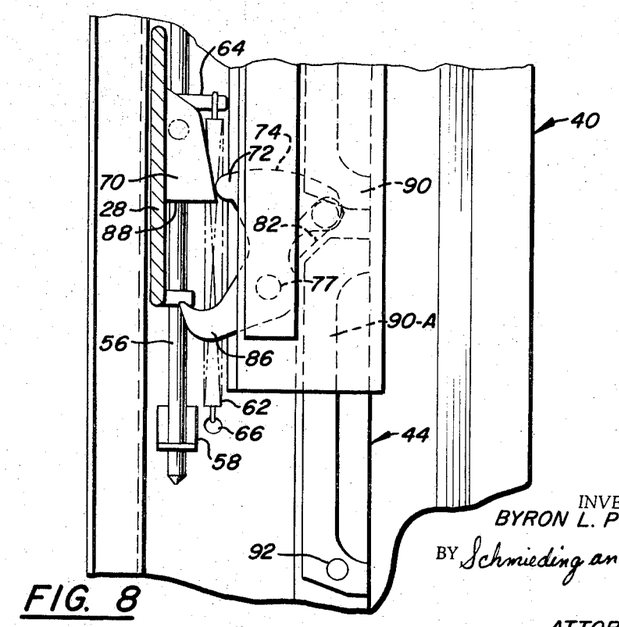
FIG. 8 is a third view of the actuating plate mechanism of FIGS. 5 through 7 showing the plate after it has been returned to its initial standby position.
Figure 12:
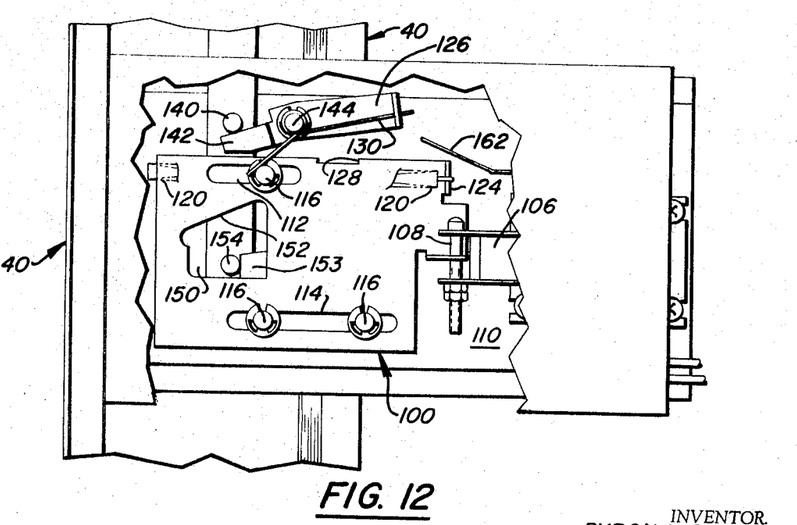
FIG. 12 is a fourth side elevational view showing the apparatus of FIGS. 9 through 11 after the article releasing gate has been fuly opened and the common bar has been moved to its extreme position of movement.

FIG. 8 illustrates gate 28 in its fully lifted and open position wherein follower pin 80 has cammed common bar 44 to its lowermost position of FIG. 12.

It should be pointed out that when the mechanism is manually moved from the position of FIG. 7 to the position of FIG. 8 follower pin 80 can move all the lock-out members 90 upwardly due to the clearance provided for shifting of the lock-out members 90 and 90–B relative to the lowermost lock-out member 90–A.

It should be further pointed out that once follower pin 80 passes the position of FIG. 7 the available end to end clearance between the lock-out members is reduced to the extent that no other follower pin 80 can enter its respective slot 82 sufficiently to permit lifting of any gate other than the one being actuated.

Figure 9:
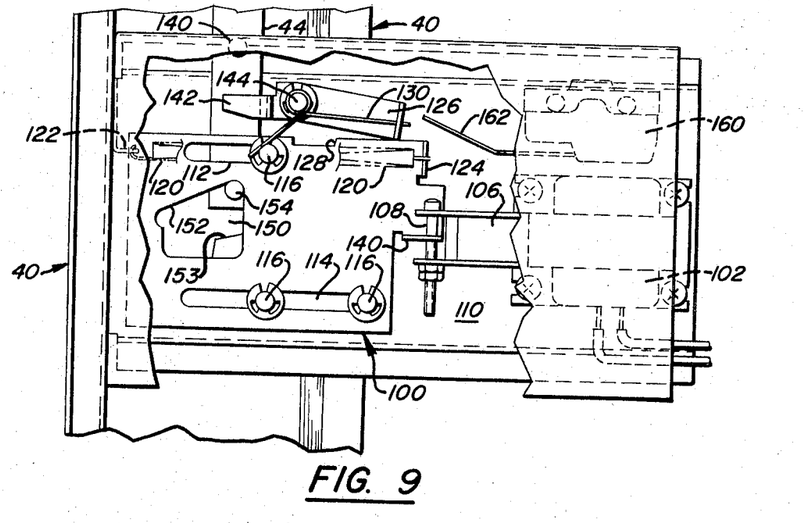
FIG. 9 is a side elevational view showing one of the article releasing gears, the gate releasing lever, and the common bar in the standby position.
Figure 10:
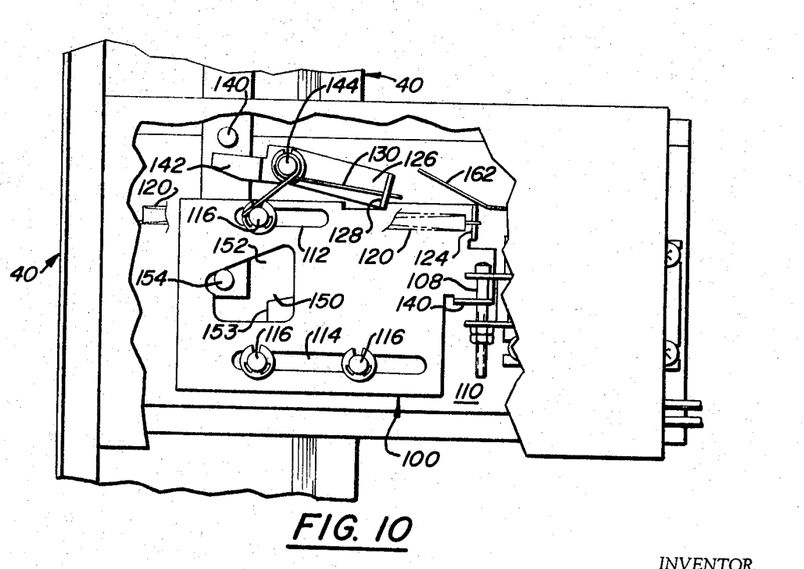
FIG. 10 is a second side elevational view showing the apparatus of FIG. 9 in the ready-to-vend position.
Figure 11:
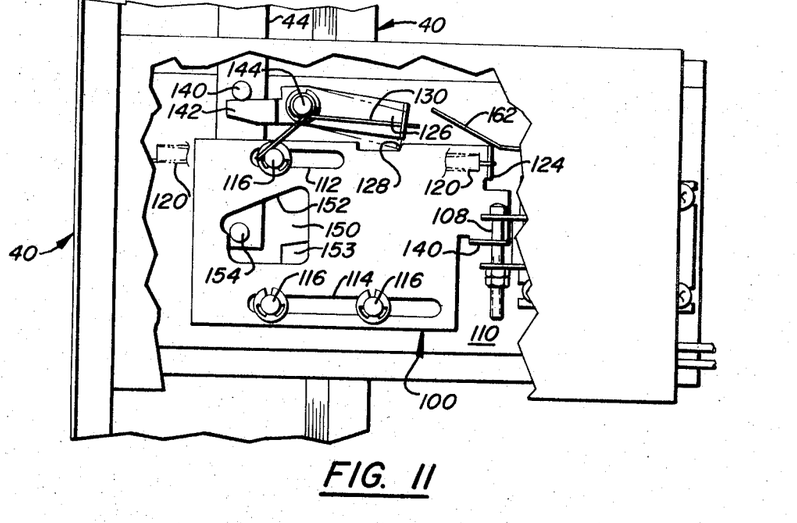
FIG. 11 is a third side elevational view showing the releasing gate and associated apparatus as it is moving from the ready-to-vend position to the lock-out position of the common bar.

Reference is next made to FIGS. 9 through 12 which illustrate operation of a common bar actuating plate mechanism that comprises a plate member indicated generally at 100 and shiftable between a first position illustrated in FIGS. 9 and 12 and a second position illustrated in FIGS. 10 and 11 by solenoid 102 that is connected in circuit with and energized by a coin acceptance mechanism indicated generally at 24 in FIG. 1.

As seen in FIG. 9, plate 100 includes an upturned flange 104 connected to an armature 106 of solenoid 102 by a bolt 108. Plate 100 is mounted for lateral shifting to a back plate 110, attached to the frame, by slots 112 and 114 through which are extended guide pins 116, the latter being mounted on back plate 110.

Actuating plate 100 is normally urged to the left or standby position seen in FIG. 9 by a tension spring 120 connected between a flange 124 on plate 100 and a flange 122 on frame panel 40.

Plate 100 is retained to the right or vending position of FIG. 10 by a latch lever 126 the right end of which is normally urged downwardly by a spring 130 towards a second latch portion or shoulder 128 formed by a slot in the upper edge of actuating plate 100.

Lever 126 is released from the latched position of FIG. 10 to the released position of FIG. 11 when a lever actuating pin 140 carried on the lower end of common bar 44 engages a left arm 142 of the lever causing it to pivot about a fulcrum pin 144 thereby lifting the lever latch portion by arm 126 out of the slot that forms latch portion 128.

Actuating plate 100 includes a cutout 150 the upper edge of which forms a cam surface 152 that rides along and drives a follower pin 154 carried on the lower end of common bar 44.

The actuating plate assembly further includes a switch 160 connected in circuit with solenoid 102 and provided with an actuating arm 162 engaged by flange 124 on plate 100. After the plate has been moved into the latched position of FIG. 10 lifting of switch arm 162 breaks the circuit to solenoid 102, after latching the plate, so that additional coin must be inserted into the machine before the next vending cycle can be started.

In operation, when a coin is inserted in the machine solenoid 102 of the common bar, actuating plate mechanism is energized whereby actuating plate 100 is shifted to the right from the position of FIG. 9 to the position of FIG. 10. This causes cam surface 152 to move follower 154 on common bar 44 downwardly to the ready-to-vend position of FIG. 10.

Any one of the plurality of article releasing gates 28 is next manually lifted from the ready-to-vend position of FIG. 6 to the position of FIG. 7 whereby common bar 44 starts to move downwardly by the camming action of lever pin 80 on the lower edge or cam surface of open ended slot 82 in the common bar.

When actuating plate 110 is shifted to the position of FIG. 6, plate latching lever 126 engages latch portion 128 on the plate and retains the plate in the position of FIG. 10.

Gate 28 is next further lifted from the position of FIG. 7 to the fully opened position of FIG. 8 whereby common bar 44 is manually urged further downwardly through the delatching position of FIG. 11 finally to the lowermost common bar position of FIG. 12 wherein plate 100 has returned to the standby position of FIG. 12.

It should be pointed out that after return of plate 100 to the left the upper inclined edge of a no-return plate 153 is positioned under the lower end of the common bar thereby positively eliminating the possibility of a double vend. This configuration of the common bar no-return plate 153 is illustrated in FIG. 9.

While the form of embodiment of the present invention as herein disclosed constitutes a preferred form, it is to be understood that other forms might be adopted, all coming within the scope of the claims which follow.

I claim:

1. A vending machine comprising, in combination, frame means; a plurality of article releasing gates moveably mounted on said frame means; a common bar slideably mounted on said frame means adjacent said gates and including a plurality of open ended slots, one for each of said gates, said common bar being moveable from a standby position first to a ready to vend position and next to a lock-out position; a plurality of gate releasing levers pivoted on said frame means, each of said levers being actuated by a respective one of said gates and including a lever portion obstructed by said common bar in said standby position and moveable into a respective one of said slots in said ready to vend position, said slots in said common bar including edges forming cam surfaces engageable by said levers for shifting said common bar from said ready to vend position to said lock-out position; and coin actuated means for shifting said common bar from said standby position to said ready to vend position.

2. A vending machine comprising, in combination, frame means; a plurality of article releasing gates moveably mounted on said frame means; a common bar slideably mounted on said frame means adjacent said gates and including a plurality of open ended slots, one for each of said gates, said common bar being moveable from a standby position first to a ready to vend position and next to a lock-out position; a plurality of gate releasing levers pivoted on said frame means, each of said levers being actuated by a respective one of said gates and including a lever portion obstructed by said common bar in said standby position and moveable into a respective one of said slots in said ready to vend position, said slots in said common bar including edges forming cam surfaces engageable by said levers for shifting said common bar from said ready to vend position to said lock-out position; a common bar actuating plate moveably mounted on said frame means for movement between first and second plate positions and engaging said common bar for moving said bar from said standby position to said ready to vend position, said plate including a first latch portion; latch means moveably mounted on said frame means and including a second latch portion engageable with said first latch portion for locking said plate in said second plate position and said common bar in said ready to vend position; and means operatively responsive to inserting a coin in said machine for moving said actuating plate to said second plate position.

3. The vending machine defined in claim 2 wherein said latch means includes a first shoulder engaged by a second shoulder on said common bar for disengaging said latch portions upon moving said common bar from said ready to vend position to said lock-out position.

4. The vending machine defined in claim 2 wherein said actuating plate includes a common bar stop that moves into the path of movement of said common bar when said actuating plate is returned from said second plate position to said first plate position upon disengagement of said latch portions.

5. A vending machine comprising, in combination, frame means; a plurality of article releasing gates moveably mounted on said frame means; a common bar slideably mounted on said frame means adjacent said gates and including a plurality of open ended slots, one for each of said gates, said common bar being moveable from a standby position first to a ready to vend position and next to a lock-out position; a plurality of gate releasing levers pivoted on said frame means, each of said levers being actuated by a respective one of said gates and including a lever portion obstructed by said common bar in said standby position and moveable into a respective one of said slots in said ready to vend position; lock-out member guide means adjacent said common bar; a plurality of lock-out members disposed in end to end relationship in said guide means and longitudinally slideably disposed along said common bar, said lock-out members being separable at their various end to end junctions that correspond with said open ended slots, the total space available between ends of said lock-out members being greater than the diameter of one of said lever portions but less than the diameter of two of said lever portions whereby only one of said lever portions can be moved into its respective open ended slot at a time, said slots in said common bar including edges forming cam surfaces engageable by said levers for shifting said common bar from said ready to vend position to said lock-out position; and coin actuated means for shifting said common bar from said standby position to said ready to vend position.

6. A vending machine comprising, in combination, frame means; a plurality of article releasing gates moveably mounted on said frame means; a common bar slideably mounted on said frame means adjacent said gates and including a plurality of open ended slots, one for each of said gates, said common bar being moveable from a standby position first to a ready to vend position and next to a lock-out position; a plurality of gate releasing levers pivoted on said frame means, each of said levers being actuated by a respective one of said gates and including a lever portion obstructed by said common bar in said standby position and moveable into a respective one of said slots in said ready to vend position; lock-out member guide means adjacent said common bar; a plurality of lock-out members disposed in end to end relationship in said guide means and longitudinally slideably disposed along said common bar, said lock-out members being separable at their various end to end junctions that correspond with said open ended slots, the total space available between ends of said lock-out members being greater than the diameter of one of said lever portions but less than the diameter of two of said lever portions whereby only one of said lever portions can be moved into its respective open ended slot at a time, said slots in said common bar including edges forming cam surfaces engageable by said levers for shifting said common bar from said ready to vend position to said lock-out position; a common bar actuating plate moveably mounted on said frame means for movement between first and second plate positions and engaging said common bar for moving said bar from said standby position to said ready to vend position, said plate including a first latch portion; latch means moveably mounted on said frame means and including a second latch portion engageable with said first latch portion for locking said plate in said second plate position and said common bar in said ready to vend position; and means operatively responsive to inserting a coin in said machine for moving said actuating plate to said second plate position.

7. The vending machine defined in claim 6 wherein said latch means includes a first shoulder engaged by a second shoulder on said common bar for disengaging said latch portions upon moving said common bar from said ready to vend position to said lock-out position.

8. The vending machine defined in claim 6 wherein said actuating plate includes a common bar stop that moves into the path of movement of said common bar when said actuating plate is returned from said second plate position to said first plate position upon disengagement of said latch portions.

9. A vending machine comprising, in combination, frame means; a plurality of article releasing gates movably mounted on said frame means; a common bar slideably mounted on said frame means and including a plurality of cam surfaces, one cam surface for each of said gates, said common bar being movable from a standby position to a ready to vend position and to a lock-out position; a plurality of gate releasing members each of which is actuated by a respective one of said gates and includes a gate releasing shoulder movable against a respective one of said cam surfaces when said common bar is in said ready to vend position for moving said common bar to said lock-out position; means on said common bar for locking out said shoulders in said standby and lock-out positions; lock-out member guide means adjacent said common bar; a plurality of lock-out members disposed in end to end relationship in said guide means and longitudinally slideably disposed along said common bar, said lock-out members being separable at their various end to end junctions that correspond with said cam surfaces, the total space available between ends of said lock-out members being greater than the diameter of one of said gate releasing shoulders but less than the diameter of two of said gate releasing shoulders whereby only one of said gate releasing shoulders can be moved against its respective cam surface at a time; and coin actuated means for shifting said common bar from said standby position to said ready to vend position.

10. A vending machine comprising, in combination, frame means; a plurality of article releasing gates movably mounted on said frame means; a common bar slideably mounted on said frame means and including a plurality of cam surfaces, one cam surface for each of said gates, said common bar being movable from a standby position to a ready to vend position and to a lock-out position; a plurality of gate releasing members each of which is actuated by a respective one of said gates and includes a gate releasing shoulder movable against a respective one of said cam surfaces when said common bar is in said ready to vend position for moving said common bar to said lock-out position; means on said common bar for locking out said shoulders in said standby and lock-out positions; a common bar actuating plate movably mounted on said frame means for movement between first and second plate positions and engaging said common bar for moving said bar from said standby position to said ready to vend position, said plate including a first latch portion; latch means movably mounted on said frame means and including a second latch portion engageable with said first latch portion for locking said plate in said second plate position and said common bar in said ready to vend position; means operatively responsive to inserting a coin in said machine for moving said actuating plate to said second plate position; and means responsive to movement of said gates for releasing the engagement between said first and second latch portions to permit the return of said actuating plate from said second plate position to said first plate position.

11. The vending machine defined in claim 10 wherein said actuating plate includes a common bar stop that moves into the path of movement of said common bar when said actuating plate is returned from said second plate position to said first plate position upon disengagement of said latch portions.

12. A vending machine comprising, in combination, frame means; a plurality of article releasing gates movably mounted on said frame means; a common bar slideably mounted on said frame means and including a plurality of cam surfaces, one cam surface for each of said gates, said common bar being movable from a standby position first to a ready to vend position and then to a lock-out position; a plurality of gate releasing members each of which is actuated by a respective one of said gates and includes a gate releasing shoulder movable against a respective one of said cam surfaces when said common bar is in said ready to vend position for moving said common bar to said lock-out position; means on said common bar for locking out said shoulders in said standby and lock-out positions; a common bar actuating plate movably mounted on said frame means for movement between first and second plate positions and engaging said common bar for moving said bar from said standby position to said ready to vend position, said plate including a first latch portion; means for biasing said actuating plate toward said first plate position; latch means movably mounted on said frame means and including a second latch portion engageable with said first latch portion for locking said plate in said second plate position and said common bar in said ready to vend position, said latch means including a first shoulder engaged by a second shoulder on said common bar for disengaging said latch portions to permit the return of said actuating plate from said second plate position to said first plate position; and means operatively responsive to inserting a coin in said machine for moving said actuating plate to said second plate position.

References Cited

UNITED STATES PATENTS

| 2,215,642 | 9/1940 | Gabrielsen | 222—125 |
| 2,727,654 | 12/1955 | Childers et al. | 221—125 X |
| 3,115,274 | 12/1963 | Burton et al. | 221—125 |
| 3,169,621 | 2/1965 | Johnson et al. | 221—125 X |

ROBERT B. REEVES, *Primary Examiner.*

KENNETH N. LEIMER, *Examiner.*